Aug. 7, 1934.　　　　　L. MacLEAN　　　　　1,969,654
DRILL SOCKET CONSTRUCTION
Filed Sept. 19, 1932
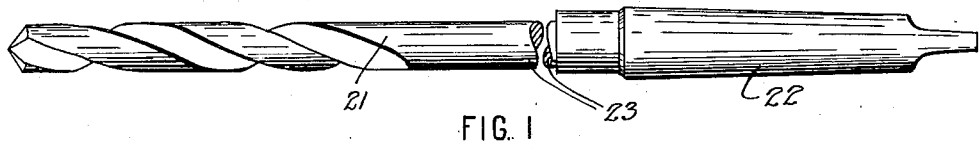
FIG. 1
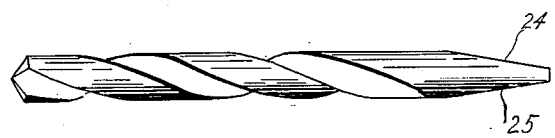
FIG. 2
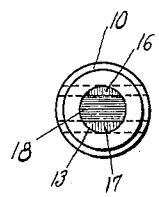　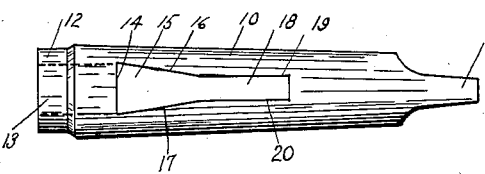　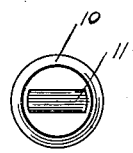
FIG. 4　　　　　FIG. 3　　　　　FIG. 5
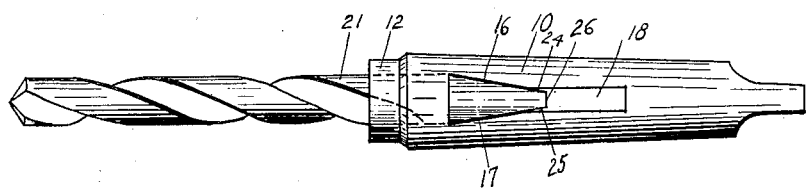
FIG. 6
FIG. 7
L. MacLean
INVENTOR
BY Edmund H. Perry Jr.
ATTORNEY Patented Aug. 7, 1934

1,969,654

UNITED STATES PATENT OFFICE 1,969,654

DRILL SOCKET CONSTRUCTION

Lauchlan MacLean, Jacksonville, Fla.

Application September 19, 1932, Serial No. 633,887

5 Claims. (Cl. 279—9)

This invention relates to twist drills, and has particular reference to a socket therefor. The principal object is to provide a socket which will enable drills broken in drill operations to be utilized, the construction being such that new or reconditioned injured drills may interchangeably be received and securely held in the socket without the necessity of any special auxiliary securing elements. Further objects and advantages of the invention will become apparent as the description proceeds.

Twist drills, at least those of large size, are provided with shanks of greater diameter than the drill proper. Such shanks taper towards their end and require a similarly tapered socket. Usually a tang is provided to prevent the drill from rotating in the socket, though the shanks in some cases are provided with flattened portions and held in the socket by a wedge, detent, or screw. If the tang or the shank break, the drill is rendered useless since it can not be reconditioned to fit the socket. The production of tapered drills and sockets is expensive, with the result that breakage entails considerable loss. I am aware that attempts have heretofore been made to render broken drills with tapered shanks usable, but the extra fittings and special sockets which have been proposed for the most part tend to make the drill run untrue and otherwise have proved unsatisfactory.

According to my invention a socket is provided having its greatest inner diameter of substantially the same size as that of the drill. Opposing wedge-shaped faces are provided interiorly of the socket adapted to engage a correspondingly shaped portion on the shank of a drill. The shape of such portion of the socket should be such that drill shanks may readily be formed to engage therewith.

The socket as just described has numerous advantages over known devices. It can be made for use with any size drill, and eliminates the necessity of the usual enlarged tapered shanks. A drill may break one or more times and quickly be reconditioned by a single grinding operation so as to fit my socket.

By reason of the construction of the socket, drills may be made more cheaply. Instead of providing a tapered enlargement on the shank, the shank can be made of uniform diameter throughout its length. New drills will be ground at the end of their shanks so as to be receivable in the socket. Then if the drill break a new wedge-shaped end identical with the original end may be provided. Thus, the socket is equally well adapted to receive either new or reconditioned drills. Of course, broken drills having the usual tapered shanks can be reconditioned to fit my socket by grinding a wedge-shaped end on the shank of the drill below the tapered enlargement.

Having now generally described my invention, I will discuss one embodiment thereof in connection with the accompanying drawing, wherein:

Fig. 1 shows a broken drill with the usual enlarged tapered shank;

Fig. 2 shows the drill of Fig. 1 reconditioned with a wedge-shaped end to fit my drill socket;

Fig. 3 is a side view of my drill socket;

Figs. 4 and 5 are views of the respective ends of the socket of Fig. 3;

Fig. 6 shows the socket illustrating particularly the manner in which a drill is supported therein; and Fig. 7 illustrates a new drill formed with a shank of uniform diameter and a removable wedge-shaped end adapted to be used with my socket.

Referring particularly to Figs. 3, 4 and 5, the numeral 10 indicates the drill socket, which as conventionally may be provided at its upper end with a tang 11. The other end 12 is bored to a diameter substantially the same as that of the round shank of the drill to be received. Such bore 13 extends inwardly for a sufficient distance, say to the line 14, so that a drill will be supported against side play and held in alignment with the socket as is necessary in order that the drill will run true.

Inwardly of the end portion 12, the socket is provided with a recessed hollow section 15 adapted to receive and engage the end of a drill having converging flattened interior faces which will engage correspondingly shaped faces on a drill. Bearing in mind that the shape of the socket in this portion should be such that the end of a broken drill shank can readily be ground to fit therein, I have found it desirable that the engaging portion of the socket be wedge-shaped, comprising opposing flat faces 16 and 17 which converge towards each other at any suitable angle. As a matter of convenience in manufacturing such faces may extend from side to side of the socket and take the form of a converging slot as shown in the drawing. On the other hand, such is not essential.

Connecting with the drill engaging portion 15 is a slot 18 through which a drift may be inserted to remove a drill from the socket. As is often the case a drill may break off just at the end of the socket so that the broken end can be removed only with great difficulty unless some expedient such as just described be resorted to.

The slot 18 has a further advantage, arising from the fact that if the wedge-shaped faces formed on the end of a drill are not coextensive with or incline at a different angle from the corresponding faces 16 and 17 of the engaging portion 15, the end of the drill may extend into the slot. Under the conditions just referred to it is obvious that the drill could not be properly seated in the socket unless a hollow portion were provided beyond the termination of the converging faces. The slot may have flat parallel faces 19 and 20 forming continuations of the converging faces 16 and 17.

A conventional drill 21, such as shown in Fig. 1, having a tapered enlargement 22 adapted to seat in a conventional socket, can if it break be reconditioned to be used in my drill socket. The broken end 23 of the drill shank will be squared off and then ground to provide a wedge-shaped tongue as shown in Fig. 2 having converging flat faces 24 and 25.

The manner in which the drill is received in my socket is shown in Fig. 6. The converging faces 24 and 25 will seat respectively against the complementary faces 16 and 17 of the engaging portions of the socket. Since the hollow end portion 12 of the socket will support the shank of the drill in alignment with the socket and prevent wabbling, it is not entirely necessary that the faces of the drill converge at exactly the same angle as the faces of the socket. In any case the drill will be prevented from turning in the socket. The extreme end 26 of the drill may extend into the slot 18.

With the arrangement described a drill may break several times and, depending on the length remaining, be reconditioned and used again in the socket.

The proposed socket eliminates the necessity of an enlarged tapered shank on any drill and thus may cut down manufacturing costs. As shown in Fig. 7, a drill may be made with a shank 28 of uniform diameter throughout its length. To make the same fit my socket it is only necessary to form a wedge-shaped end 29 thereon. If the shank break in use the remaining end may quickly be renewed by grinding it to wedge shape.

While I have indicated that it is desirable as a matter of practice to provide the drill shank end and engaging portion of the socket with two flat inclined faces, I do not intend to limit myself to that number, since other shapes of the engaging portion of the socket will carry out the purpose of preventing the drill from turning in the socket. It will be understood, therefore, that I do not intend to be limited in the practice of my invention further than may be required by the accompanying claims.

What I claim is:

1. A drill holder having walls defining a cylindrical socket for receiving a drill shank, with an inwardly converging wedge shaped extension and an adjoining cavity at the small end of the extension.

2. A drill holder having walls defining a cylindrical socket for receiving a drill shank, with an inwardly converging wedge shaped extension and an adjoining cavity at the small end of the extension having opposed flat faces extending in parallel relation.

3. A drill holder comprising an integral cylindrical body bored to define a cylindrical drill receiving socket, said socket at its inner end terminating in a hollow drill engaging part wherein two opposing wall portions constituting continuations of the socket wall are flattened and inclined slightly towards each other as a single pair of gradually converging wedge faces adapted to engage flattened surfaces on the end of a cylindrical drill, said converging wedge faces terminating short of the line of intersection of the planes in which they lie, and there being a cavity adjoining the rear ends of said faces adapted to receive the end of the drill shank and permit the faces to firmly grip the drill shank, the drill engaging part in the areas intermediate the wedge faces being shaped to receive straight portions of the cylindrical drill shank.

4. A drill holder having an end portion bored to receive the shank of a straight sided drill, said holder having a slot extending transversely through the holder and connecting with the bore of the end portion said slot being defined by converging oppositely disposed flat interior faces.

5. A drill holder having an end portion bored to receive the shank of a straight sided drill, said holder having a slot extending transversely through the holder connecting with the bore in the end portion, said slot being defined by oppositely disposed flat interior faces, said faces converging for part of their length to provide a wedge-shaped interior and then beyond the wedge-shaped area flattening out and extending in parallel relation.

LAUCHLAN MacLEAN.